United States Patent
Savonnet et al.

(10) Patent No.: US 9,714,195 B2
(45) Date of Patent: Jul. 25, 2017

(54) SIZING COMPOSITION FOR MINERAL WOOL AND INSULATING PRODUCTS OBTAINED

(71) Applicant: SAINT-GOBAIN ISOVER, Courbevoie (FR)

(72) Inventors: Marie Savonnet, Paris (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 14/917,737

(22) PCT Filed: Sep. 9, 2014

(86) PCT No.: PCT/FR2014/052224
§ 371 (c)(1),
(2) Date: Mar. 9, 2016

(87) PCT Pub. No.: WO2015/033084
PCT Pub. Date: Mar. 12, 2015

(65) Prior Publication Data
US 2016/0214890 A1    Jul. 28, 2016

(30) Foreign Application Priority Data
Sep. 9, 2013 (FR) ..................... 13 58626

(51) Int. Cl.
| C03C 25/32 | (2006.01) |
| C09J 103/02 | (2006.01) |
| D04H 1/4218 | (2012.01) |
| D04H 1/587 | (2012.01) |
| D04H 1/64 | (2012.01) |
| F16L 59/02 | (2006.01) |

(52) U.S. Cl.
CPC ........... *C03C 25/321* (2013.01); *C09J 103/02* (2013.01); *D04H 1/4218* (2013.01); *D04H 1/587* (2013.01); *D04H 1/64* (2013.01); *F16L 59/028* (2013.01)

(58) Field of Classification Search
CPC ...... C03C 25/321; C09J 103/02; D04H 1/587; D04H 1/64; D04H 1/4218; F16L 59/028
See application file for complete search history.

(56) References Cited

U.S. PATENT DOCUMENTS

| 5,318,990 A | 6/1994 | Strauss |
| 5,340,868 A | 8/1994 | Strauss et al. |
| 5,661,213 A | 8/1997 | Arkens et al. |
| 5,895,804 A | 4/1999 | Lee et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2009/0156724 A1 | 6/2009 | Espiard et al. |
| 2011/0210280 A1 | 9/2011 | Jaffrennou |
| 2013/0026408 A1* | 1/2013 | Jaffrennou ............. C03C 25/26 252/8.83 |
| 2013/0032749 A1 | 2/2013 | Jaffrennou et al. |

FOREIGN PATENT DOCUMENTS

| WO | WO 2006/120523 A1 | 11/2006 |
| WO | WO 2008/053332 A1 | 5/2008 |
| WO | WO 2009/080938 A2 | 7/2009 |
| WO | WO 2010/029266 A1 | 3/2010 |
| WO | WO 2012/138723 A1 | 10/2012 |
| WO | WO 2012/166414 A1 | 12/2012 |
| WO | WO 2013/021112 A1 | 2/2013 |

OTHER PUBLICATIONS

International Search Report as issued in International Patent Application No. PCT/FR2014/052224, dated Dec. 23, 2014.

* cited by examiner

*Primary Examiner* — Anthony J Green
(74) *Attorney, Agent, or Firm* — Pillsbury Winthrop Shaw Pittman LLP

(57) ABSTRACT

A sizing composition for insulating products based on mineral wool, in particular glass or rock wool, includes at least one reducing saccharide, at least one hydrogenated saccharide, at least one polyfunctional crosslinking agent, and at least one polyglycerol.

29 Claims, No Drawings

SIZING COMPOSITION FOR MINERAL WOOL AND INSULATING PRODUCTS OBTAINED

CROSS-REFERENCE TO RELATED APPLICATIONS

This application is the U.S. National Stage of PCT/FR2014/052224, filed Sep. 9, 2014, which in turn claims priority to French patent application number 1358626 filed Sep. 9, 2013. The content of these applications are incorporated herein by reference in their entireties.

The present invention relates to the field of thermal and/or acoustic insulating products based on mineral wool, in particular glass or rock wool, and on a formaldehyde-free organic binder.

The invention more particularly relates to a sizing composition capable of crosslinking to form said organic binder, which includes a reducing saccharide, a hydrogenated saccharide, a polyfunctional crosslinking agent and a polyglycerol.

Another subject matter of the invention is the acoustic and/or thermal insulating products based on mineral wool which result therefrom.

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten mineral material (glass or rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form therein a web of fibers (or mineral wool).

External centrifugation consists, for its part, in pouring out the molten material at the external peripheral surface of rotating members, known as rotors, from where the molten material is ejected under the action of the centrifugal force. Means for drawing by gas stream and for collecting on a receiving member are also provided.

In order to provide for the assembly of the fibers together and to make it possible for the web to have cohesion, a sizing composition comprising a thermosetting resin is projected onto the fibers, on the route between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above. At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

The commonest resols are obtained by condensation of phenol and formaldehyde, in the presence of a basic catalyst. In the end, these resols comprise a certain proportion of unreacted monomers, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea, in its turn at least partially decomposed to give ammonia, which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known and are based on the use of a carboxylic acid and of an alcohol.

In U.S. Pat. No. 5,340,868, the size comprises a polycarboxylic polymer, a β-hydroxyamide and an at least trifunctional monomeric carboxylic acid.

A description has also been given of sizing compositions comprising an alkanolamine including at least two hydroxyl groups and a polycarboxylic polymer (U.S. Pat. Nos. 6,071,994, 6,099,773, 6,146,746) which can be combined with a copolymer (U.S. Pat. No. 6,299,936).

Provision has also been made for sizing compositions comprising a polycarboxylic polymer and a polyol (U.S. 2002/0091185, U.S. 2002/0091185). These compositions can additionally comprise a catalyst which can be a phosphorus-comprising compound (U.S. Pat. Nos. 5,318,990, 5,661,213, 6,331,350, U.S. 2003/0008978), a fluoroborate (U.S. Pat. No. 5,977,232) or else a cyanamide, a dicyanamide or a cyanoguanidine (U.S. Pat. No. 5,932,689), or a cationic, amphoteric or nonionic surfactant (U.S. 2002/0188055), or also a coupling agent of silane type (U.S. 2004/0002567).

A description is given, in WO 2006/120523, of a sizing composition which comprises (a) a poly(vinyl alcohol), (b) a multifunctional crosslinking agent chosen from nonpolymeric polyacids or their salts, anhydrides or a nonpolymeric polyaldehyde and (c) optionally a catalyst, the (a)/(b) ratio by weight varying from 95:5 to 35:65 and the pH being at least equal to 1.25.

There is also known, from WO 2008/053332, a sizing composition which comprises an adduct (a) of a sugar polymer and (b) of a multifunctional crosslinking agent chosen from monomeric polyacids or their salts, and the anhydrides, which is obtained under conditions such that the (a)/(b) ratio by weight varies from 95:5 to 35:65.

Furthermore, sizing compositions have been described for which all or a portion of the alcohol is replaced with one or more saccharides.

In US 2005/0215153, the sizing composition is formed from a prebinder comprising a polymer of carboxylic acid and of a polyol and from a dextrin as cobinder.

In U.S. Pat. No. 5,895,804, the sizing composition comprises a polycarboxylic polymer with a molecular weight at least equal to 1000 and a polysaccharide with a molecular weight at least equal to 10 000.

In WO 2009/080938, the sizing composition comprises at least one organic polycarboxylic acid with a molar mass of less than or equal to 1000 and at least one monosaccharide and/or polysaccharide.

WO 2010/029266 discloses a sizing composition which comprises at least one hydrogenated sugar and a polyfunctional crosslinking agent.

Finally, a description is given, in WO 2013/021112, of a sizing composition for mineral wool which comprises at least one reducing saccharide, at least one hydrogenated saccharide and at least one polyfunctional crosslinking agent and in which composition the hydrogenated saccharide represents from 10% to 90% of the total weight of the reducing saccharide and hydrogenated saccharide.

The aim of the present invention is to improve the abovementioned sizing composition in order for it to confer better mechanical properties on insulating products based on mineral wool, in particular an enhanced thickness recovery after compression, without reducing the tensile strength. In some cases, the latter may even be increased.

This aim is achieved by virtue of the addition of at least one polyglycerol to the sizing composition.

More specifically, the sizing composition for an insulating product based on mineral wool, in particular glass or rock wool, comprises:
at least one reducing saccharide,
at least one hydrogenated saccharide,
at least one polyfunctional crosslinking agent, and
at least one polyglycerol.

The expression "reducing saccharide" should be understood in the conventional sense, namely that it describes a monosaccharide or a polysaccharide carrying a free hemiacetal OH group, this group having in particular a reducing action on alkaline copper solutions.

Mention may be made, as examples of reducing monosaccharides, of the reducing saccharides including from 3 to 8 carbon atoms, preferably aldoses and advantageously the aldoses comprising from 5 to 7 carbon atoms.

The aldoses which are particularly preferred are natural aldoses (belonging to the D series), in particular hexoses, such as glucose, mannose and galactose.

The reducing polysaccharide in accordance with the invention is chosen from reducing polysaccharides having a weight-average molar mass of less than 100 000, preferably of less than 50 000, advantageously of less than 10 000 and better still of greater than 180.

Advantageously, the reducing polysaccharide exhibits a polydispersity index (PI), defined by the ratio of the weight-average molar mass to the number-average molar mass, which is less than or equal to 10.

Preferably, the reducing polysaccharide includes at least one unit chosen from the abovementioned aldoses, advantageously glucose. The reducing polysaccharides which are predominantly composed (to more than 50% by weight) of glucose units are particularly preferred.

According to a preferred embodiment, the invention uses a mixture of reducing monosaccharide(s) and/or polysaccharide(s), in particular obtained from plants, especially a dextrin.

Dextrins are compounds corresponding to the general formula $(C_6H_{10}O_5)_n$ obtained by partial hydrolysis of starch. The processes for the preparation of dextrins are known. For example, dextrins can be prepared by heating or by drying to dryness a starch, generally in the presence of an acid catalyst, which results in the constituent amylose and amylopectin molecules of said starch being ruptured to give products of lower molar mass. Dextrins can also be obtained by treating the starch enzymatically with one or more amylases, in particular microbial amylases, capable of hydrolyzing the bonds of the starch. The nature of the treatment (chemical or enzymatic) and the hydrolysis conditions have a direct effect on the average molar mass and the distribution of the molar masses of the dextrin.

The dextrins in accordance with the invention can be obtained from starch or starch derivatives of varied plant origin, for example resulting from tubers, such as potato, cassava, maranta and sweet potato, resulting from seeds, such as wheat, corn, rye, rice, barley, millet, oats and sorghum, resulting from fruit, such as horse chestnut, sweet chestnut and hazelnut, or resulting from leguminous plants, such as peas and beans.

Preference is given in particular to the dextrins having a dextrose equivalent (DE) of greater than or equal to 5, preferably of greater than or equal to 10, advantageously of greater than or equal to 15 and better still of less than 100.

Conventionally, the dextrose equivalent DE is defined by the following relationship:

$$DE = 100 \times \left( \frac{\text{number of glycoside bonds cleaved}}{\text{number of glycoside bonds in the starting starch}} \right)$$

The term "hydrogenated saccharide" is understood to mean all of the products resulting from the reduction, in whatever way, of a saccharide chosen from monosaccharides, oligosaccharides or polysaccharides, which can be linear, branched or cyclic, and the mixtures of these products, in particular starch hydrolysates.

The saccharide can be hydrogenated by the known methods operating under high hydrogen pressure and temperature conditions, in the presence of a catalyst chosen from Groups Ib, IIb, IVb, VI, VII and VIII of the Periodic Table of the Elements, preferably from the group consisting of nickel, platinum, palladium, cobalt, molybdenum and their mixtures. The preferred catalyst is Raney nickel. The hydrogenation converts the saccharide or the mixture of saccharides (for example, a starch hydrolysate) into the corresponding polyols.

Although not being preferred, the hydrogenation can be carried out in the absence of hydrogenation catalyst, in the presence of a source of hydrogen other than gas, for example an alkali metal borohydride, such as sodium borohydride.

Mention may be made, as examples of hydrogenated saccharides, of erythritol, arabitol, xylitol, sorbitol, mannitol, iditol, maltitol, isomaltitol, lactitol, cellobitol, palatinitol, maltotritol and the hydrogenation products of starch hydrolysates, sold in particular by Roquette under the Polysorb® name. Preferably, use is made of the hydrogenation products of starch hydrolysates, advantageously a maltitol syrup.

The hydrogenated saccharide in accordance with the invention has a number-average molar mass of less than 100 000, preferably of less than 50 000, advantageously of less than 5000, more particularly of less than 1000 and better still of greater than 150.

In the sizing composition, the hydrogenated saccharide(s) preferably represent(s) from 18% to 80% of the total weight of the reducing saccharide(s) and hydrogenated saccharide(s), advantageously from 30% to 70% and better still from 35% to 60%.

The polyfunctional crosslinking agent is capable of reacting with the hydroxyl groups of the reducing saccharide, of the hydrogenated saccharide and of the polyglycerol under the effect of heat to form ester bonds which result in a polymeric network being obtained in the final binder. Said polymeric network makes it possible to establish bonds at the junctions of the fibers in the mineral wool.

The polyfunctional crosslinking agent is chosen from organic polycarboxylic acids or the salts of these acids, anhydrides and polyaldehydes.

"Organic polycarboxylic acid" is understood to mean an organic acid comprising at least two carboxyl functional groups, preferably at most 300, advantageously at most 70 and better still at most 15 carboxyl functional groups.

The organic polycarboxylic acid can be a nonpolymeric or polymeric acid; it exhibits a number-average molar mass generally of less than or equal to 50 000, preferably of less than or equal to 10 000 and advantageously of less than or equal to 5000.

The nonpolymeric organic polycarboxylic acid is a saturated or unsaturated and straight or branched acyclic acid, a cyclic acid or an aromatic acid.

The nonpolymeric organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid; a tricarboxylic acid, for example citric acid, tricarballylic acid, 1,2,4-butanetricarboxylic acid, aconitic acid, hemimellitic acid, trimellitic acid and trimesic acid; or a tetracarboxylic acid, for example 1,2,3,4-butanetetra-carboxylic acid and pyromellitic acid.

Particularly advantageously, the nonpolymeric organic polycarboxylic acid includes from two to four carboxyl functional groups.

Mention may be made, as examples of polymeric organic polycarboxylic acids, of homopolymers of unsaturated carboxylic acid, such as (meth)acrylic acid, crotonic acid, isocrotonic acid, maleic acid, cinnamic acid, 2-methylmaleic acid, fumaric acid, itaconic acid, 2-methylitaconic acid, α,β-methyleneglutaric acid and monoesters of unsaturated dicarboxylic acids, such as $C_1$-$C_{10}$ alkyl maleates and fumarates, and copolymers of at least one abovementioned unsaturated carboxylic acid and of at least one vinyl monomer, such as of styrene, unsubstituted or substituted by alkyl, hydroxyalkyl or sulfonyl groups or by a halogen atom, (meth)acrylonitrile, (meth)acrylamide, unsubstituted or substituted by $C_1$-$C_{10}$ alkyl groups, alkyl (meth)acrylates, in particular methyl (meth)acrylate, ethyl (meth)acrylate, n-butyl (meth)acrylate and isobutyl (meth)acrylate, glycidyl (meth)acrylate, butadiene and a vinyl ester, in particular vinyl acetate.

Preferably, the sizing composition comprises at least one nonpolymeric organic polycarboxylic acid having a number-average molar mass of less than or equal to 1000, preferably of less than or equal to 750 and advantageously of less than or equal to 500 and including from two to four carboxyl functional groups, optionally as a mixture with at least one polymeric organic acid.

The polyfunctional crosslinking agent can also be an anhydride, in particular maleic anhydride, succinic anhydride or phthalic anhydride. However, the addition of an anhydride to the sizing composition brings about a large drop in the pH, which causes problems of corrosion of the appliances in the manufacturing line and of hydrolysis of the hydrogenated saccharide. The introduction of a base makes it possible to bring the pH of the sizing composition to a value sufficient to prevent these problems. The cost related to the supplementary addition of the base means that the use of anhydride is not preferred.

The polyfunctional crosslinking agent can also be a polyaldehyde. "Polyaldehyde" is understood to mean an aldehyde comprising at least two aldehyde functional groups.

Preferably, the polyaldehyde is a nonpolymeric dialdehyde, for example glyoxal, glutaraldehyde, 1,6-hexanedial or terephthaldehyde.

The polyaldehydes have a very high reactivity with regard to the hydroxyl groups of the reducing saccharide and of the hydrogenated saccharide but also to hydroxyl groups in general, which may present disadvantages, in particular a decrease in the stability and/or a pregelling of the sizing composition before the thermal crosslinking treatment. In order to avoid these disadvantages, the aldehyde functional groups of the polyaldehyde are advantageously blocked in order to prevent the reaction with the constituents present in the sizing composition before the entry of the mineral wool into the oven. Mention may be made, as example of agent which makes it possible to block the aldehyde functional groups, of urea and cyclic ureas.

Among the abovementioned polyfunctional crosslinking agents, organic polycarboxylic acids are preferred. The polyglycerol in accordance with the invention exhibits a degree of polymerization which varies from 2 to 20, preferably from 2 to 10 and better still from 2 to 8. Advantageously, use is made of a mixture of polyglycerols comprising at least 50% by weight of diglycerol, of triglycerol and of tetraglycerol and better still of diglycerol and of triglycerol.

In the sizing composition, the reducing saccharide(s) and the hydrogenated saccharide(s) represent(s) from 10% to 90% of the weight of the mixture consisting of the reducing saccharide(s), the hydrogenated saccharide(s) and the polyfunctional crosslinking agent, preferably from 20% to 85%, advantageously from 30% to 80%, better still from 40% to 65% and particularly advantageously from 45% to 65%.

The polyglycerol(s) generally represent(s) from 2% to 50% of the total weight of the reducing saccharide(s), the hydrogenated saccharide(s) and the crosslinking agent, preferably from 5% to 25% and advantageously from 7% to 15%.

Generally, the sizing composition according to the invention does not comprise monoalkylamine, dialkylamine and alkanolamine. This is because it is not desirable for these compounds (which are capable of reacting with the other constituents of the sizing composition) to be incorporated in the polymeric network of the final binder.

The sizing composition can additionally comprise an acidic or basic catalyst which has in particular the function of adjusting the crosslinking start temperature.

The catalyst can be chosen from Lewis bases and acids, such as clays, colloidal or noncolloidal silica, organic amines, quaternary amines, metal oxides, metal sulfates, metal chlorides, urea sulfates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst may also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate.

Preferably, the catalyst is sodium hypophosphite, sodium phosphite and the mixtures of these compounds.

The amount of catalyst introduced into the sizing composition can represent up to 20% of the total weight of the reducing saccharide(s), the hydrogenated saccharide(s) and the polyfunctional crosslinking agent, preferably up to 10%, and is advantageously at least equal to 1%.

The sizing composition in accordance with the invention can additionally comprise the conventional additives below in the following proportions, calculated on the basis of 100 parts by weight of reducing saccharide(s), of hydrogenated saccharide(s) and of polyfunctional crosslinking agent:
from 0 to 2 parts of silane, in particular an aminosilane or an epoxysilane,
from 0 to 20 parts of oil, preferably from 4 to 15 parts,
from 0 to 5 parts of a silicone,
from 0 to 20 parts of a polyol other than the abovementioned reducing saccharide, the abovementioned hydrogenated saccharide and the abovementioned polyglycerol,
from 0 to 30 parts of an "extender" chosen from lignin derivatives, such as ammonium lignosulfonate (ALS) or sodium lignosulfonate, and animal or plant proteins.

The role of the additives is known and is briefly restated: the silane is an agent for coupling between the fibers and the binder, and also acts as antiaging agent; the oils are dust-preventing and hydrophobic agents; the silicone is a hydrophobic agent having the role of reducing the absorption of water by the insulating product; the "extender" is an organic filler, soluble or dispersible in the aqueous sizing composition, which makes it possible in particular to reduce the cost of the sizing composition.

The polyol added as additive is necessarily different from the reducing saccharide, hydrogenated saccharide and polyglycerol. This polyol can in particular be glycerol, a glycol, such as ethylene glycol, propylene glycol, butylene glycol and the poly(alkylene) glycols based on these glycols, or vinyl alcohol homopolymers and copolymers.

When the polyfunctional crosslinking agent is an organic polycarboxylic acid, the sizing composition exhibits an acidic pH, generally of less than or equal to 5 and preferably of greater than or equal to 1.0. Advantageously, the pH is maintained at a value at least equal to 1.5, so as to limit the problems of instability of the sizing composition and of corrosion of the manufacturing line, by virtue of the addition of an amine compound which is not capable of reacting with the reducing saccharide and the hydrogenated saccharide, for example a tertiary amine, in particular triethanolamine. The amount of amine compound can represent up to 30 parts by weight of the total weight of the reducing saccharide(s), hydrogenated saccharide(s) and crosslinking agent, in particular an organic polycarboxylic acid.

The sizing composition is intended to be applied to mineral wool, in particular glass or rock wool.

Conventionally, the sizing composition is projected onto the mineral fibers at the outlet of the centrifugal device and before they are collected on the receiving member in the form of a web of fibers which is subsequently treated at a temperature which makes possible the crosslinking of the size and the formation of an infusible binder. The crosslinking of the size according to the invention takes place at a temperature comparable to that of a conventional formaldehyde-phenol resin, at a temperature greater than or equal to 110° C., preferably greater than or equal to 130° C. and advantageously greater than or equal to 140° C.

The acoustic and/or thermal insulating products obtained from these sized fibers also constitute a subject matter of the present invention.

These products are generally provided in the form of a mat or felt of mineral wool, of glass or rock wool.

The following examples make it possible to illustrate the invention without, however, limiting it.

In these examples, the following are measured:
the viscosity, expressed in mPa·s, using a rheometer of cone/plate rotational type (diameter: 6 mm; 2°) with shearing which varies from 5 to 500 s$^{-1}$ at 20° C.
the moisture content of the mat composed of the non-crosslinked sized glass wool, before it passes through the oven, by weighing before and after drying in a chamber at 105° C. for 1 hour. The moisture content of the mat is expressed in %.
the tensile strength according to the standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in newtons) of the sample is measured and the tensile strength TS, defined by the ratio of the breaking force F to the weight of the sample, is calculated. The tensile strength is measured after manufacture ($TS_{man}$) and after treatment in an autoclave at 105° C. and 100% relative humidity for 15 minutes ($TS_{15}$).
the initial thickness of the insulating product and the thickness after compressing for different periods of time with a degree of compression (defined as being the ratio of the nominal thickness to the thickness under compression) equal to 8/1. The thickness measurements make it possible to evaluate the good dimensional behavior of the product.

EXAMPLES 1 TO 6

These examples illustrate the manufacture of insulating products based on glass wool on an industrial line.

The mineral wool is produced continuously on a line with a width of 2.4 m by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is positioned beneath the fiberizing disk so as to uniformly distribute the sizing composition over the glass wool which has just been formed.

The mineral wool, thus sized, is collected on a belt conveyor equipped with internal extraction boxes which hold the mineral wool in the form of a felt or of a web at the surface of the conveyor. The conveyor subsequently passes continuously through an oven at 270° C., where the constituents of the size polymerize to form a binder.

The insulating product obtained on leaving the oven exhibits a nominal density equal to 10.6 kg/m$^3$ and a nominal thickness equal to 80 mm. The amount of binder represents 5.2±0.5% of the insulating product.

The sizing compositions used are given in table 1, the amounts being expressed as parts by weight. They are prepared by simple mixing of the constituents in water with vigorous stirring until the constituents have completely dissolved or dispersed.

Examples 1 to 4 according to the invention exhibit a greater tensile strength than comparative example 6, which comprises glycerol, and a tensile strength comparable to or greater than that of comparative example 5, which does not comprise it.

The thickness after 30 days of the products of examples 1 to 4 is greater than that of comparative examples 5 and 6.

With respect to comparative examples 5 and 6, the presence of polyglycerol in examples 1 to 4 has the advantage of greatly reducing (at least half) the moisture content of the sized mat and of maintaining its value at a level comparable to that obtained with glycerol.

EXAMPLES 7 AND 8

The operation is carried out under the conditions of examples 1 to 6, modified in that the temperature of the oven is equal to 260° C., in that the insulating product obtained exhibits a nominal density equal to 17.5 kg/m$^3$ and a nominal thickness equal to 75 mm and in that the sizing composition has the composition given in the following table 2, the amounts being expressed as parts by weight.

TABLE 2

|  | Ex. 7 | Ex. 8 (comp.) |
|---|---|---|
| Composition |  |  |
| Dextrin[1] | 31.00 | 55.00 |
| Maltitol syrup[2] | 24.00 | — |
| Citric acid | 45.00 | 45.00 |
| Polyglycerol |  |  |
| Oxicure ® 510[4] | 10.00 | 10.00 |
| Sodium hypophosphite | 5.00 | 5.00 |
| γ-Aminopropyltriethoxysilane | 0.50 | 0.50 |
| Mineral oil | 8.00 | 8.00 |
| Silicone | 0.90 | 0.90 |
| Properties of the product |  |  |
| Tensile strength (N/g) |  |  |
| TS$_{man}$ | 3.77 | 2.57 |
| TS$_{15}$ | 2.90 | 2.00 |
| Thickness (mm) |  |  |
| initial | 106 | 82 |
| after 30 days | 90 | 71 |

Example 7, which comprises a hydrogenated sugar, exhibits a greater tensile strength (after manufacture and after treatment in an autoclave) and a greater thickness (initial and after 30 days) than comparative example 8, which does not comprise it.

TABLE 1

|  | Ex. 1 | Ex. 2 | Ex. 3 | Ex. 4 | Ex. 5 (comp.) | Ex. 6 (comp.) |
|---|---|---|---|---|---|---|
| Composition |  |  |  |  |  |  |
| Dextrin[1] | 31.00 | 31.00 | 31.00 | 33.10 | 31.00 | 31.00 |
| Maltitol syrup[2] | 24.00 | 24.00 | 24.00 | 17.90 | 24.00 | 24.00 |
| Citric acid | 45.00 | 45.00 | 45.00 | 49.00 | 45.00 | 45.00 |
| Polyglycerol |  |  |  |  |  |  |
| Diglycerol | 10.00 | — | — | — | — | — |
| PGLC3[3] | — | 10.00 | — | — | — | — |
| Oxicure ® 510[4] | — | — | 10.00 | 7.25 | — | — |
| Glycerol | — | — | — | — | — | 10.00 |
| Sodium hypophosphite | 5.00 | 5.00 | 5.00 | 5.30 | 5.00 | 5.00 |
| γ-Aminopropyltriethoxysilane | 0.50 | 0.50 | 0.50 | 0.50 | 0.50 | 0.50 |
| Mineral oil | 8.00 | 8.00 | 8.00 | 8.50 | 8.00 | 8.00 |
| Silicone | 0.90 | 0.90 | 0.90 | 0.90 | 0.90 | 0.90 |
| Properties of the sized mat before passing through the oven |  |  |  |  |  |  |
| Moisture content (%) | 5.0 | 6.5 | 5.5 | 6.0 | 12.0 | 5.0 |

TABLE 1-continued

|  | Ex. 1 | Ex. 2 | Ex. 3 | Ex. 4 | Ex. 5 (comp.) | Ex. 6 (comp.) |
|---|---|---|---|---|---|---|
| Properties of the product |  |  |  |  |  |  |
| Tensile strength (N/g) | 1.76 | 1.94 | 1.93 | 1.90 | 1.80 | 1.69 |
| Thickness after 30 days (mm) | 124 | 123 | 124 | 121 | 118 | 119 |

[1] dextrin resulting from corn starch; weight-average molar mass: 3510; polydispersity index PI: 5.2; dextrose equivalent DE: 30; sold under the reference Roclys ® C3072S by Roquette Freres
[2] maltitol syrup with a solids content of 75% comprising 55% of maltitol; sold under the reference Maltilite ® 5575 by Tereos Syral
[3] mixture comprising (as % by weight): diglycerol (25.3%), triglycerol (46.6%), tetraglycerol (18.8%), pentaglycerol (6.0%), hexaglycerol (2.0%) and heptaglycerol (0.7%); sold by Solvay
[4] mixture comprising (as % by weight): glycerol (29.0%), diglycerol (30.0%), triglycerol (19.0%), tetraglycerol (11.0%), pentaglycerol (6.0%), hexaglycerol (3.0%), heptaglycerol (1.0%) and octaglycerol (1%); sold by Cargill
n.d.: not determined

The invention claimed is:

1. A sizing composition for insulating products based on mineral wool, comprising:
   at least one reducing saccharide,
   at least one hydrogenated saccharide,
   at least one polyfunctional crosslinking agent, and
   at least one polyglycerol.

2. The composition as claimed in claim 1, wherein the reducing saccharide is chosen from reducing monosaccharides including from 3 to 8 carbon atoms.

3. The composition as claimed in claim 2, wherein the reducing monosaccharide is an aldose.

4. The composition as claimed in claim 3, wherein the aldose is a hexose.

5. The composition as claimed in claim 1, wherein the reducing saccharide is a reducing polysaccharide exhibiting a weight-average molar mass of less than 100 000 and of greater than 180.

6. The composition as claimed in claim 5, wherein the reducing polysaccharide is composed, to more than 50% by weight, of glucose units.

7. The composition as claimed in claim 1, wherein the reducing saccharide is a mixture of reducing monosaccharide(s) and/or reducing polysaccharide(s).

8. The composition as claimed in claim 7, wherein the reducing polysaccharide(s) is a dextrin and the dextrin exhibits a dextrose equivalent of greater than or equal to 5 of less than 100.

9. The composition as claimed in claim 1, wherein the hydrogenated saccharide is chosen from erythritol, arabitol, xylitol, sorbitol, mannitol, iditol, maltitol, isomaltitol, lactitol, cellobitol, palatinitol, maltotritol and the hydrogenation products of starch hydrolysates.

10. The composition as claimed in claim 9, wherein the hydrogenated saccharide is the hydrogenation product of a starch hydrolysate.

11. The composition as claimed in claim 9, wherein the hydrogenated saccharide has a number-average molar mass of less than 100 000 of greater than 150.

12. The composition as claimed in claim 1, wherein the polyglycerol exhibits a degree of polymerization which varies from 2 to 20.

13. The composition as claimed in claim 12, wherein the polyglycerol is a polyglycerol mixture comprising at least 50% by weight of diglycerol, of triglycerol and of tetraglycerol.

14. The composition as claimed in claim 1, wherein the hydrogenated saccharide(s) represent(s) from 18% to 80% of the total weight of the reducing saccharide(s) and hydrogenated saccharide(s).

15. The composition as claimed in claim 1, wherein the polyfunctional crosslinking agent is chosen from organic polycarboxylic acids or the salts of these acids, anhydrides and polyaldehydes.

16. The composition as claimed in claim 15, wherein the organic polycarboxylic acid comprises at least two carboxyl functional groups, and at most 300 carboxyl functional groups.

17. The composition as claimed in claim 16, wherein the organic polycarboxylic acid is a nonpolymeric or polymeric acid that exhibits a number-average molar mass generally of less than or equal to 50 000.

18. The composition as claimed in claim 16, wherein the organic polycarboxylic acid is nonpolymeric and includes from two to four carboxyl functional groups.

19. The composition as claimed in claim 15, wherein the anhydride is maleic anhydride, succinic anhydride or phthalic anhydride.

20. The composition as claimed in claim 15, wherein the polyaldehyde is a nonpolymeric dialdehyde.

21. The composition as claimed in claim 1, wherein the reducing saccharide(s) and the hydrogenated saccharide(s) represent(s) from 10% to 90% of the weight of the mixture consisting of the reducing saccharide(s), the hydrogenated saccharide(s) and the polyfunctional crosslinking agent.

22. The composition as claimed in claim 1, wherein the polyglycerol(s) represent(s) from 2% to 50% of the total weight of the reducing saccharide(s), the hydrogenated saccharide(s) and the polyfunctional crosslinking agent.

23. The composition as claimed in claim 1, further comprising a catalyst chosen from Lewis acids and bases, phosphorus-comprising compounds and compounds comprising fluorine and boron.

24. The composition as claimed in claim 20, wherein the catalyst represents up to 20% of the total weight of the reducing saccharide(s), the hydrogenated saccharide(s) and the polyfunctional crosslinking agent.

25. The composition as claimed in claim 1, further comprising the additives below in the following proportions, calculated on the basis of 100 parts by weight of reducing saccharide(s), of hydrogenated saccharide(s) and of polyfunctional crosslinking agent:
   from 0 to 2 parts of silane,
   from 0 to 20 parts of oil,
   from 0 to 5 parts of a silicone,
   from 0 to 20 parts of a polyol other than the abovementioned reducing saccharide, the abovementioned hydrogenated saccharide and the abovementioned polyglycerol,
   from 0 to 30 parts of an extender chosen from lignin derivatives and animal or plant proteins.

26. An acoustic and/or thermal insulating product based on mineral wool sized with the sizing composition as claimed in claim 1.

27. The composition as claimed in claim 4, wherein the aldose is glucose, mannose or galactose.

28. The composition as claimed in claim 15, wherein the polyaldehyde is glyoxal, glutaraldehyde, 1,6-hexanedial or terephthaldehyde.

29. The composition as claimed in claim 25, wherein the lignin derivatives include ammonium lignosulfonate (ALS) or sodium lignosulfonate.

\* \* \* \* \*